United States Patent [19]

Carpenter et al.

[11] Patent Number: 4,669,516

[45] Date of Patent: Jun. 2, 1987

[54] V-SHAPED CHIPPER KNIFE

[75] Inventors: Charles T. Carpenter; Robert M. Bayly, both of Lake Oswego, Oreg.

[73] Assignee: Duratech, Inc., Tigard, Oreg.

[21] Appl. No.: 798,912

[22] Filed: Nov. 18, 1985

[51] Int. Cl.[4] ........................ B23G 13/00; B02C 18/18

[52] U.S. Cl. .................................... 144/241; 144/176; 241/92; 241/296

[58] Field of Search ................... 144/176, 162 R, 218, 144/235, 241; 241/92, 91, 189 R, 278 R, 292.1, 296, 298

[56] References Cited

U.S. PATENT DOCUMENTS 4,298,044 11/1981 Hansel et al. ........................ 144/241

4,545,413 10/1985 Sunberg et al. ...................... 144/241

*Primary Examiner*—W. D. Bray

*Attorney, Agent, or Firm*—Kolisch, Hartwell & Dickinson

[57] ABSTRACT

A chipper knife includes a pair of elongate blade portions integrally joined at a midplane which longitudinally bisects the blade. The blade portions are symmetrical and have inner and outer surfaces. The outer surface intersects the midplane at an acute angle and the inner surface intersects the midplane at a lesser acute angle. The inner and outer surfaces therefore diverge from each other as they extend outward from the midplane. The outer surface of each blade portion terminates in a cutting edge. A mounting for the knife is carried on a chipper disc and includes a base for supporting the inner surfaces of the blade portion with a cutting edge thereof disposed outwardly from the disc surface and a hold down plate engaging an outer surface of the blade to secure the knife to the mounting.

9 Claims, 3 Drawing Figures

V-SHAPED CHIPPER KNIFE

BACKGROUND AND SUMMARY OF THE INVENTION

The instant invention relates to chipper knives and particularly to a double-edged chipper knife which is easily installed in a chipping head.

Chipper knives are used in chipping machines during the production of wood chips which are ultimately used in making paper and other composite wood products. Known chippers generally have a rotatable chipping disc which carries a plurality of chipper knives mounted thereon. The knives may be as much as 4 feet long and can weight 60–70 pounds. The size and weight of the knives create handling problems when it is necessary to replace a worn or dull knife.

Although chipper blades have been used, with several of the blades being mounted to form a continuous knife, the geometry of these blades has been somewhat complex and requires extensive machining to create a blade having the desired shape.

An object of the instant invention is to provide a chipper knife which is easily installed and replaced in a chipping machine.

A further object of the instant invention is to provide a chipper knife with two cutting edges which can be conveniently used in a "returnable" system and which is replacable in multiple knife segments.

Still another object of the invention is to provide a chipper knife which is firmly held in a mounting in a chipping apparatus.

Another object of the instant invention is to provide a chipper knife having a simple geometric form.

Yet another object of the instant invention is to provide a chipping apparatus having a wear-resistent mounting for a chipper knife.

A further object of the invention is to provide a chipper knife which will deflect chips formed thereby away from a mounting holding the knife.

The chipper knife of the invention, in a specific embodiment, includes a pair of elongate blade portions which are integrally joined at a midplane. The midplane longitudinally bisects the blade. The blade portions have an outer surface which intersects the midplane at an acute angle and an inner surface which intersects the midplane at a lesser acute angle than that formed by the outer surface. The outer surface of each blade portion terminates in a cutting edge. A mounting for the knife includes a base portion which supports the inner surfaces of the blade portions with the cutting edge of one of the blade portions paralleling a rotatably mounted chipper disc, to which the mounting is attached. The mounting includes a hold down plate which engages the outer surface of the other blade portion.

These and other objects of the instant invention will become more fully apparent as the description which follows is read in conjunction with the drawings.

DETAILED DESCRIPTION OF A PREFERRED EMBODIMENT

Figure 1:
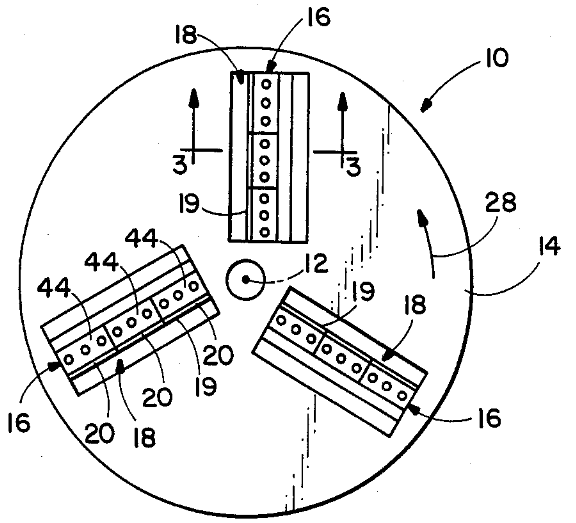
FIG. 1 is a plan view of a chipper disc having a mounting and chipper knives constructed according to the invention mounted thereon.

Turning now to the drawings, and initially to FIG. 1, a chipper disc is shown at 10. Disc 10 would be rotatably mounted, about an axis 12 in a chipping machine. Disc 10 has a substantially planar disc surface 14 which is normal to axis 12.

Figure 3:
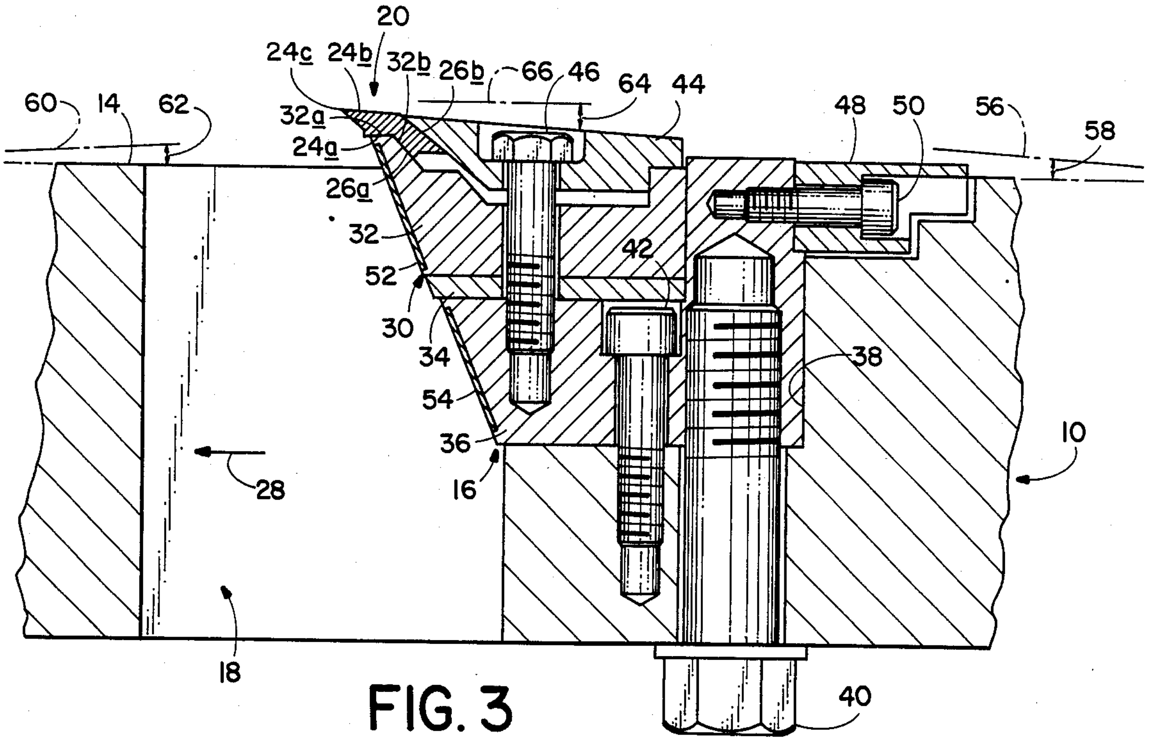
FIG. 3 is a partial, greatly enlarged, cross-section of a mounting and chipper knife, taken generally along the line 3—3 of FIG. 1.

Referring now to FIGS. 1 and 3, disc 10 has multiple knife mountings, such as mounting 16, affixed thereto. Although in the preferred embodiment, there are three such mountings, it should be understood that discs may be constructed to contain six or more such mountings, all of which are radially secured to the disc. Adjacent each mounting is an opening 18 which extends through the disc and allows passage of wood chips through the disc. A chipper knife assembly 19 is carried in mounting 16 and is operable to shave wood chips from a log as the log is brought in contact with disc surface 14. Assembly 19 includes, in the preferred embodiment, three chipper knife segments 20.

Figure 2:
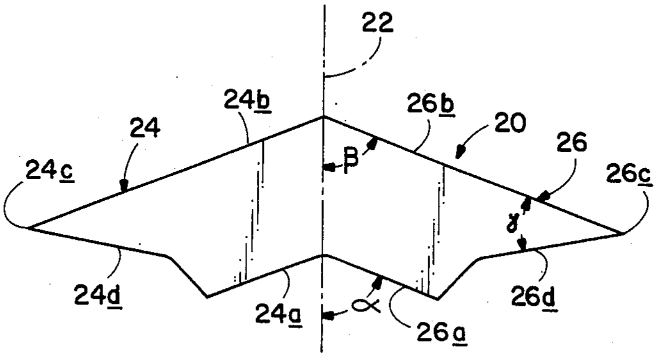
FIG. 2 is a greatly enlarged end view of a chipper knife constructed according to the invention.

Turning now to FIG. 2, knife segment or knife 20 will be described in greater detail. Knife 20, in the preferred embodiment, has a substantially V-shaped cross-section. The knife has a midplane 22 and a two symmetrically formed blade portions 24, 26 which are integrally joined at midplane 22. Each portion has an inner surface 24*a*, 26*a* and an outer surface 24*b*, 26*b*, respectively.

The inner surfaces intersect plane 22 at an angle alpha while the outer surfaces intersect the midplane at an angle beta. The knife is constructed such that angle alpha is less than angle beta, with the result that the inner surface and the outer surface diverge as they proceed outward from midplane 22. In the preferred embodiment, angle alpha may range between 58° and 68° while angle beta may range between 65° and 75°, with optimum values being 62.5° and 69.5°, respectively.

Each outer surface terminates in a cutting edge 24*c*, 26*c*, respectively. A concave, chip deflecting surface 24*d*, 26*d* extends between the cutting edges and the inner surfaces. The deflecting surface forms an angle gamma with the outer surface, and, in the preferred embodiment, has a value of 35°.

Returning now to FIGS. 1 and 3, knife 20 is mounted in mounting 16 for rotation, as indicated by arrow 28 with disc 10. Mounting 16 includes a base, shown generally at 30. Base 30 includes a knife support 32, a spacer 34 and an adapter element 36. Base 30 is received in a notch 38 formed in disc 10 adjacent opening 18. Adapter element 36 is secured to disc 10 by bolt 40 and cap screw 42.

A hold down plate 44 is operable to secure knife 20 to base 30, and specifically, secures knife 20 to knife support 32. A bolt 46 fastens hold down plate 44 and knife support 32 and spacer 34 to adapter element 36.

An adapter spacer extension 48 is fixed to the rear portion of adapter element 36 by a cap screw 50. An anticavitation plate 52 is fixed to knife support 32 and a second anti-cavitation plate 54 is fixed to adapter element 36. Plates 52, 54 comprise what is referred to herein as anti-cavitation means and are fixed to the support 32 and element 36 as by brazing.

Referring to FIG. 1, each mounting 16, in the preferred embodiment, has three hold down plates 44, which hold three individual knife segments 20.

Returning now to FIG. 3, knife 20 is held on knife support 32 with inner surfaces 24*a*, 26*a* in contact with knife seat portion 32*a*, 32*b* of support 32. This arrangement allows for the exposure of cutting edge 24*c* which is then operable, as the disc rotates, to shave wood chips from a log. Hold down plate 44 engages outer surface 26*b* of blade portion 26, also referred to herein as the other blade portion. This arrangement of knife support 32 and hold down plate 44 results in contact between knife 20 and knife mounting 16 along three surfaces and further results in the knife being held firmly in place on the mounting.

The mounting is constructed and arranged such that an extension of outer surface 24*b*, as indicated by line 56, intersects the plane of disc surface 14 at an acute angle 58. An extension 60 of inner knife surface 24 intersects the plane of surface 14 at an angle 62. Thus, knife 20 is provided with a planing clearance angle 64, which is defined as the angle between exposed outer surface 24*b* and a line 66, which is parallel to the plane of disc surface 14. Angle 64, in the preferred embodiment, has a value of between 1° and 5°. Angle 62 may have a value of between 2° and 6°.

As disc 10 rotates in the direction of arrow 28, knife 20 will impact the log introduced into a chipping mechanism containing disc 10. The forces induced on knife 20 will tend to urge the knife rearward (to the right in FIG. 3) and against hold down plate 44. Plate 44 is so constructed that the rearward forces on it are transmitted to knife support 32 and ultimately to the rest of mounting 16. However, the angular relationship between hold down plate 44 and knife 20 are such that a portion of the forces induced on knife 20 are transmitted downward on knife surfaces 32*a*, and 32*b*, and particularly to seat 32*a* in contact with inner knife surface 24*a*. With blade surface 24*a* tightly pressed against seat 32*a*, a seal is formed between the two surfaces which precludes the entry of fluids, wood splinters or sawdust into the region between knife 20 and knife support 32. This arrangement reduces the amount of tar buildup on the contact surfaces of knife 20 and support 32 and the wedging action of plate 44 and support 32 maintains knife 20 in a consistent aligned condition.

As wood chips are cut from a log by knife 20, the chips are directed downward, relative to FIG. 3, through opening 18. Deflector surface 24*d* initially directs the chips downward, although, as the disc rotates, the chips tend to impact the leading surfaces of support 32 and adapter element 36. Eventually, the constant striking of chips on these surfaces wears the surfaces, requiring the blade support and adapter element to be replaced. The inclusion of anticavitation plates 52, 54 which are formed of extremely hard alloy material, greatly extends the life of support 32 and adapter element 36. At such time as plates 52, 54 have been worn by the striking thereon of wood chips, the plates may be removed and replaced with new plates.

The provision of plates 52, 54 maintains the slope of the leading edge of base 30. It has been demonstrated that as this slope is worn, and becomes concave, horsepower requirements for driving disc 10 increase. The provision of anti-cavitation plates 52, 54 maintain the flat, sloped surface of base 30 and therefore, allow the rotation of disc 10 at a constant speed for a defined horsepower. A chipper so equipped produces chips having consistent size.

In order to adjust knife mounting 16 to produce chips of different sizes, spacer 34 is provided. Spacer 34 may be removed and replaced with a spacer having a greater or lesser thickness, as is dictated by the desired size of chip to be produced, thereby raising or lowering the cutting edge of knife 20 relative to surface 14.

In operation, a set of knives are installed on the chipper disc by removing bolts 46 and removing hold down plates 44, removing the old knives and installing a new set. As is shown in FIG. 1, each mounting 16 includes, in the preferred embodiment, three hold down plates and three knife segments, such as knife 20. This arrangement allows the replacement of a single knife segment should the segment become chipped or worn sooner than the other segments in the particular mounting. As previously noted, a single chipper knife may be 3 to 4 feet long and weigh 60 to 70 pounds. The provision of knife segments, such as knife segment 20, results in a structure which is perhaps 9 inches to 12 inches long, and weighs approximately 1 pound. The arrangement of bolts 46 and plate 44 allows knives to be replaced from the "top" side of the disc, which can be accomplished by a single maintenance person.

Once the new knife segments are in position, hold down plates 44 and bolts 46 are reinstalled and the chipper is ready for operation. As is to be expected, after the chipper operates for several hours, the operable, exposed cutting edges of knives 20 will become dulled. At this point, bolts 46 are undone, plates 44 lifted and knives 20 reversed such that the heretofore unused cutting edge, 26*c*, is exposed. Once the hold down plates and bolts 46 are again secured, the chipper is again ready for operation. Once both edges of knife 20 have been used, a new set of knives may be installed on the disc. The used knives may be sharpened on site, returned to a central sharpening facility, or may be discarded, depending on economic considerations.

The construction of knife 20, as described herein, requires substantially less material than that required for known removable knife elements, and, because of its simplified geometry, is much easier to form and sharpen. Additionally, the construction of knife mounting 16, as described, also features simplified geometries. The use of double-edged knives greatly reduces the time required to change knives. The structures produce uniform chip sizes and increases chip production over a specified time period.

Although the invention has been described in conjunction with a substantially V-shaped knife segment, it should be appreciated that other knife geometries could be utilized.

Although a preferred embodiment of the invention has been disclosed, it should be appreciated that certain variations and modifications may be made thereto without departing from the spirit of the invention.

It is claimed and desired to secure by Letters Patent:

1. A chipper knife consisting of a pair of elongate blade portions integrally joining at a midplane longitudinally bisecting the knife, the blade portions being symmetrical and having inner surfaces that intersect said midplane at an acute angle and outer surfaces intersecting said midplane at a greater acute angle, wherein the inner and outer surfaces of a blade portion diverge from each other, the outer surface of each blade portion terminating in a cutting edge.

2. The knife of claim 1, which includes a concave chip-deflecting surface extending between the cutting edge of a blade portion and the inner surface of the blade portion.

3. The knife of claim 1, wherein the blade portions defines a substantially V-shaped cross-section to the knife.

4. The knife of claim 1, wherein each outer surface intersects said midplane at an angle ranging from 65° to 75° and each inner surface intersects said midplane at an angle ranging from 58° to 68°.

5. A chipper knife comprising:

a pair of elongate blade portions integrally joining at a midplane longitudinally bisecting the knife, the blade portions being symmetrical about said midplane; the blade portions defining a substantially V-shaped cross-section to the knife and each having outer surfaces which intersect said midplane at an acute angle and inner surfaces which intersect said midplane at an angle less than that formed by the intersection of the outer surface and the midplane, the inner and outer surfaces of a blade portion diverging from each other, and the outer surface of each blade portion terminating at a cutting edge;

the knife further including a concave chip-deflecting surface extending between the cutting edge of each blade portion and the inner surface of the blade portion.

6. The knife of claim 5, wherein each outer surface intersects said midplane at an angle of ranging from 65° to 75° and each inner surface intersects said midplane at an angle ranging from 58° to 68°.

7. A chipping apparatus comprising:

a rotatably mounted chipper disc having a disc surface which is normal to the axis of the disc, an elongate chipper knife consisting of a pair of elongate blade portions integrally joining at a midplane longitudinally bisecting the knife, the blade portions being symmetrical, the blade portions having inner surfaces and outer surfaces that intersect said midplane at an acute angle, the outer surfaces of the blade portions terminating in a cutting edge paralleling the said midplane, a mounting for the knife on said disc comprising a base supporting the inner surfaces of the blade portions in the knife, said knife being supported with the cutting edge of one of the blade portions paralleling but disposed outwardly from said disc surface and leading the base, an extension of the outer surface of said one blade portion intersecting the disc surface at an acute angle, said mounting further including a hold down plate engaging the outer surface of the other blade portion in the knife.

8. The apparatus of claim 7, which further includes anti-cavitation means mounted on the leading edge of said base, wherein said cutting edge has a concave chip-deflecting surface extending, with the knife fixed in said mount, towards said anti-cavitation means.

9. The apparatus of claim 7, wherein said inner surface and said outer surface diverge as they extend outward from said midplane.

* * * * *